(12) United States Patent
Woodward (10) Patent No.: US 10,046,274 B2
(45) Date of Patent: Aug. 14, 2018

(54) METHODS AND SYSTEMS FOR INHIBITING CRYSTALLINE BUILDUP IN A FLUE GAS DESULFURIZATION UNIT

(71) Applicant: BIG MONKEY SERVICES, LLC, Evanston, WY (US)

(72) Inventor: Brian Clair Woodward, Evanston, WY (US)

(73) Assignee: Big Monkey Services, LLC., Evanston, WY (US)

( * ) Notice: Subject to any disclaimer, the term of this patent is extended or adjusted under 35 U.S.C. 154(b) by 135 days.

(21) Appl. No.: 14/839,037

(22) Filed: Aug. 28, 2015

(65) Prior Publication Data
US 2017/0056822 A1    Mar. 2, 2017

(51) Int. Cl.
*B01D 53/85* (2006.01)
*F23J 3/02* (2006.01)
*F23J 15/04* (2006.01)
*B01D 53/50* (2006.01)

(52) U.S. Cl.
CPC .......... *B01D 53/85* (2013.01); *B01D 53/502* (2013.01); *F23J 3/02* (2013.01); *F23J 15/04* (2013.01); *B01D 53/507* (2013.01); *B01D 2251/304* (2013.01); *B01D 2251/402* (2013.01); *B01D 2251/404* (2013.01); *B01D 2251/604* (2013.01); *B01D 2251/606* (2013.01); *B01D 2251/95* (2013.01); *B01D 2252/61* (2013.01); *B01D 2257/302* (2013.01); *F23J 2215/20* (2013.01); *F23J 2217/50* (2013.01)

(58) Field of Classification Search
CPC ................................. B01D 53/84; B01D 53/85
See application file for complete search history.

(56) References Cited

U.S. PATENT DOCUMENTS

| 4,834,955 | A | * | 5/1989 | Mouche | ............... | B01D 53/502 |
|---|---|---|---|---|---|---|
| | | | | | | 252/180 |
| 6,056,934 | A | | 5/2000 | Carlsen et al. | | |
| 6,056,937 | A | | 5/2000 | Carlsen et al. | | |
| 6,656,249 | B1 | | 12/2003 | Buisman et al. | | |
| 7,060,233 | B1 | | 6/2006 | Srinivas et al. | | |

(Continued)

OTHER PUBLICATIONS

Sun et al. Abstract of "Study on scale inhibition properties of gama-PGA". Journal of East China Normal University (May 2010), 3 pages.*

(Continued)

*Primary Examiner* — William H. Beisner
(74) *Attorney, Agent, or Firm* — Workman Nydegger (57) ABSTRACT

Methods and systems for inhibiting buildup of crystalline materials in a flue gas desulfurization (FGD) unit. Crystalline materials can accumulate in FGD units as a byproduct of chemical desulfurization processes and can adversely impact FGD unit function. The systems described in the present application include an FGD unit with one or more selected bacterial strains disposed therein. It is believed that the bacteria may form a biofilm on the surfaces in the FGD and/or form a biosurfactant to inhibit or prevent buildup of crystalline materials in the FGD unit. Methods include inoculating an FGD unit with one or more selected bacteria that inhibit or prevent buildup of crystalline materials in the FGD unit. Methods may include periodic reinoculation of the FGD unit.

18 Claims, 2 Drawing Sheets

(56) References Cited

U.S. PATENT DOCUMENTS

| | | | |
|---|---|---|---|
| 7,325,603 B2 * | 2/2008 | Kotlar | C07K 14/00 166/246 |
| 7,531,159 B2 | 5/2009 | Lanning et al. | |
| 8,070,863 B2 | 12/2011 | Tsangaris et al. | |
| 8,306,665 B2 | 11/2012 | Tsangaris et al. | |
| 8,353,980 B2 | 1/2013 | Murphy | |
| 8,372,169 B2 | 2/2013 | Tsangaris et al. | |
| 8,413,967 B2 | 4/2013 | Johnson et al. | |
| 8,690,975 B2 | 4/2014 | Tsangaris et al. | |
| 2012/0115201 A1 | 5/2012 | Adams | |
| 2017/0341963 A1 | 11/2017 | Woodward | |

OTHER PUBLICATIONS

Nolan, Paul S., "Flue Gas Desulfurization Technologies for Coal-Fired Power Plants," Presented at the Coal-Tech 2000 International Conference, Nov. 13-14, 2000, Jakarta Indonesia, 13 pages.

Mortson, Murray, et al., "Flue Gas Desulfurization Using Recycled Sodium Bicarbonate," Presented at the US EPA/DOE/EPRI Combined Power Plant Air Pollutant Control Symposium: "The Mega Symposium," on Aug. 20-23, 2001, Chicago, IL, US, 6 pages.

"Flue-Gas Desulfurization," Wikipedia, the free encyclopedia, Accessed Jan. 29, 2015 at https://en.wikipedia.org/wiki/Flue-gas_desulfurization 8 pages.

"Naughton Plant," PacfiCorp, Jan. 2011, 2 pages.

Srivastava, R.K., et al., "Flue Gas Desulfuization: The State of the Art," Journal of Air and Waste Management Association, Dec. 2001 vol. 51, pp. 1676-1688.

U.S. Appl. No. 15/437,662, filed Feb. 21, 2017, Woodward.

* cited by examiner

METHODS AND SYSTEMS FOR INHIBITING CRYSTALLINE BUILDUP IN A FLUE GAS DESULFURIZATION UNIT

BACKGROUND

Coal-fired electricity-generating plants may use sulfur dioxide ($SO_2$) scrubbers to reduce the amount of $SO_2$ that is discharged into the atmosphere. This is good environmental practice and is generally mandated by environmental regulations in most countries, including the United States, Canada, and all of Western Europe. Additionally, scrubbers can trap pollutants like mercury and other heavy metals that would otherwise be discharged with the flue gas. $SO_2$ emissions are known to cause detrimental impacts on human health and the environment. The major health concerns associated with exposure to high ambient concentrations of $SO_2$ include breathing difficulty, respiratory illness, and aggravation of existing cardiovascular disease. In addition to the health impacts, $SO_2$ leads to acid deposition (e.g., acid rain) in the environment. This deposition causes acidification of lakes and streams and damage to tree foliage and agricultural crops. Furthermore, acid deposition accelerates the deterioration of buildings and monuments. While airborne, $SO_2$ and its particulate matter (PM) derivatives contribute to visibility degradation.

Combustion of sulfur-containing fuels, such as coal and oil, results in $SO_2$ formation. Electricity-generating plants account for the majority of $SO_2$ emissions in the United States. The Acid Rain $SO_2$ Reduction Program, established under Title IV of the Clean Air Act Amendments of 1990, was designed to reduce $SO_2$ emissions from the power-generating industry. Phase I of this program began on Jan. 1, 1995, and ended on Dec. 31, 1999. In 1997, 423 electricity-generating units, affected under Phase I, emitted 5.4 million tons ($4903.2 \times 10^6$ kg) of $SO_2$ compared with the allowable 7.1 million tons ($6446.8 \times 10^6$ kg). Phase II of the Acid Rain $SO_2$ Reduction Program began on Jan. 1, 2000. To meet the requirements of this phase, some power plants may use flue gas desulfurization (FGD) technologies. Additional environmental benefits that may result from the use of these technologies are synergistic reductions in Hg and other pollutant emissions, as well as reductions in fine PM concentrations in the atmosphere.

However, FGD technologies present a number of operational challenges. For instance, FGD scrubber units are subject to large amounts of buildup that may, over time, restrict the flow of the flue gas and reduces the efficiency of the FGD scrubber.

SUMMARY

Described herein are methods and systems for inhibiting or preventing buildup of crystalline materials in a flue gas desulfurization (FGD) unit. Crystalline materials can accumulate in an FGD unit as a byproduct of chemical desulfurization processes and can adversely impact FGD unit function by, for instance, restricting the flow of the flue gas and thereby reducing the efficiency of the FGD scrubber. Outages required for cleaning FGD scrubber unit(s) are expensive, time consuming, and present significant safety issues. The systems described in the present application include an FGD unit that includes one or more selected bacterial strains disposed therein. It is believed that the bacteria may form a biofilm and/or form a biosurfactant to inhibit or prevent buildup of crystalline materials in the FGD unit. Methods include inoculating an FGD unit with one or more selected bacteria that inhibit or prevent buildup of crystalline materials in the FGD unit. Methods may include periodic reinoculation of the FGD unit.

In an embodiment, a method for inhibiting crystalline buildup in a flue gas desulfurization (FGD) unit is described. The method includes providing an FGD unit configured for desulfurization of a flue gas, preparing an inoculum that comprises a bacterial strain (e.g., a biosurfactant and/or biofilm producing bacterium) adapted to grow in the FGD unit and to inhibit crystalline formation therein, wherein the inoculum has a selected volume and a selected bacterial cell density in a range of 0.01 weight % (wt %) to 10 wt %, and inoculating the FGD unit with a first amount of the inoculum such that the bacteria are present on one or more surfaces therein so as to inhibit crystalline buildup in the FGD unit. In a preferred embodiment, the bacterial strain in the inoculum comprises one or more of *Bacillus subtilis, Bacillus chitinosporus*, and variants thereof.

In another embodiment, the method further includes reinoculating the FGD unit with at least a second amount of the inoculum. In one embodiment, the reinoculating may, for example, occur hourly, daily, or weekly.

A typical FGD unit includes (1) a vessel with a flue gas inlet and a flue gas outlet and a liquid reservoir containing a desulfurization agent, (2) a recirculation/spray system configured to recirculate and spray the desulfurization agent through the FGD unit, and (3) one or more contact surfaces in the vessel configured for contacting flue gas and the desulfurization agent recirculated and sprayed from the reservoir. The contact surfaces typically include one or more perforated plates intended to provide an increased surface area for contact between the flue gas and the desulfurization agent. The bacterial inoculum may be added to the liquid reservoir containing a desulfurization agent; recirculation of the desulfurization agent throughout the FGD unit also causes to the bacteria to be circulated throughout the unit where it can inhibit crystalline buildup on the sprayers, contact surfaces, etc.

In another embodiment, a system is described. The system may include a flue gas desulfurization (FGD) unit as described above and a bacterial strain disposed in the FGD unit, wherein the bacterial strain is adapted to grow in the FGD unit and to inhibit crystalline formation therein.

In yet another embodiment, a system includes a flue gas desulfurization (FGD) unit that includes: a vessel having a flue gas inlet and a flue gas outlet and a first liquid reservoir containing a desulfurization agent, a recirculation/spray system configured to desulfurization agent through the FGD unit, and one or more contact surfaces in the vessel configured for contacting the flue gas and the desulfurization agent recirculated from the reservoir, wherein the one or more contact surfaces include a perforated plate. The system further includes a second liquid reservoir that is outside the FGD unit that contains desulfurization agent, wherein the second liquid reservoir is fluidly connected to the FGD unit via a conduit and a pump, and wherein the second liquid reservoir is configured to replenish the desulfurization agent in the FGD unit. The system further includes a third reservoir containing a selected bacterial strain adapted to grow in the FGD unit, wherein the third reservoir is coupled to the FGD unit via a conduit and a feed system, and wherein the third reservoir is configured for inoculating the FGD unit with the selected bacterial strain adapted to grow in the FGD unit to inhibit crystalline buildup in the FGD unit.

In one embodiment, the selected bacterial strain may be provided in a dry form. In such an embodiment, the feed system may be configured to mix a predetermined amount of the dry form with an aqueous medium prior to inoculating the FGD unit. In another embodiment, the selected bacterial strain may be provided in a liquid form. In such a case, the feed system may be configured to pump the liquid into the FGD unit (e.g., into the first liquid reservoir) so as to inoculate the FGD unit.

These and other objects and features of the present invention will become more fully apparent from the following description and appended claims, or may be learned by the practice of the invention as set forth hereinafter.

DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

Described herein are methods and systems for inhibiting or preventing buildup of crystalline materials in a flue gas desulfurization (FGD) unit. Crystalline materials can accumulate in an FGD unit as a byproduct of chemical desulfurization processes and can adversely impact FGD unit function by, for instance, restricting the flow of the flue gas and thereby reducing the efficiency of the FGD scrubber. Outages required for cleaning FGD scrubber unit(s) are expensive, time consuming, and present significant safety issues. The systems described in the present application include an FGD unit that includes one or more selected bacterial strains disposed therein. It is believed that the bacteria may form a biofilm and/or form a biosurfactant to inhibit or prevent buildup of crystalline materials in the FGD unit. Methods include inoculating an FGD unit with one or more selected bacteria that inhibit or prevent buildup of crystalline materials in the FGD unit. Methods may include periodic reinoculation of the FGD unit.

I. Introduction

Fossil fuels such as coal and oil contain a significant amount of sulfur. When fossil fuels are burned, about 95 percent or more of the sulfur is generally converted to sulfur dioxide ($SO_2$). Such conversion happens under normal conditions of temperature and of oxygen present in the flue gas. $SO_2$ is a pollutant in its own right. But under certain conditions (e.g., excess oxygen in the combustion gas and/or elevated temperature), $SO_2$ can be converted to $SO_3$. $SO_3$ is readily converted to sulfuric acid in the atmosphere. Generally, about 1% of the sulfur dioxide will be converted to $SO_3$. Sulfuric acid mist is often the cause of the blue haze that often appears as the flue gas plume dissipates.

Most FGD systems employ two stages: one for fly ash removal and the other for $SO_2$ removal. Attempts have been made to remove both the fly ash and $SO_2$ in one scrubbing vessel. However, these systems experienced severe maintenance problems and low removal efficiency. In wet scrubbing systems, the flue gas normally passes first through a fly ash removal device, either an electrostatic precipitator or a wet scrubber, and then into the $SO_2$ scrubber. Another important design consideration associated with wet FGD systems is that the flue gas exiting the absorber is saturated with water and still contains some $SO_2$. These gases are highly corrosive to any downstream equipment such as fans, ducts, and stacks. Methods that may minimize corrosion include, but are not limited to: (1) condensing the liquid from the cleaned flue gas before it exits the FGD unit, (2) reheating the gases to above their dew point, or (3) using materials of construction and designs that allow equipment to withstand the corrosive conditions.

The cleansing action produced by gas-liquid absorbers is typically derived from the passage of gas through a tower cocurrently or countercurrently to a descending liquid that absorbs the acidic gases. A conventional configuration for a gas-liquid absorber includes a tower equipped with an inlet duct through which combustion (flue) gas enter and rises through the tower. Above the inlet duct, the tower is equipped with multiple banks of spray headers or other suitable devices to introduce a desulfurization agent, typically an alkaline slurry or solution, into the tower. Intimate contact between the desulfurization agent and the flue gas rising through the tower results in a cleansing action in which $SO_x$ and other pollutants are reacted and/or entrapped within the desulfurization agent. The cleansed (scrubbed) flue gas continues to rise through the tower, typically passes through a mist eliminator, and may then be heated or passed directly to the atmosphere. The desulfurization agent falls within the tower and accumulates in a tank, from which the desulfurization agent is recycled to the spray headers. While in the tank, the absorbed gases can be reacted to produce a byproduct that is removed before the desulfurization agent is returned to the spray headers.

$SO_2$ is an acid gas, and, therefore, the typical desulfurization agents used to remove the $SO_2$ from the flue gases are therefore alkaline. Typical desulfurization agents include calcium carbonate (limestone), calcium-magnesium carbonate (dolomite), calcium oxide, calcium hydroxide $Ca(OH)_2$, sodium carbonate ($Na_2CO_3$), sodium hydroxide (NaOH), magnesium hydroxide ($Mg(OH)_2$), and the like. By far, the most common types of FGD scrubbers use calcium carbonate.

The reaction taking place in wet scrubbing using a $CaCO_3$ (limestone) slurry produces $CaSO_3$ (calcium sulfite) and can be expressed as:

$$CaCO_3 \text{ (solid)} + SO_2 \text{ (gas)} \rightarrow CaSO_3 \text{ (solid)} + CO_2 \text{ (gas)}$$

When wet scrubbing with a $Ca(OH)_2$ (lime) slurry, the reaction also produces $CaSO_3$ (calcium sulfite) and can be expressed as:

$$Ca(OH)_2 \text{ (solid)} + SO_2 \text{ (gas)} \rightarrow CaSO_3 \text{ (solid)} + H_2O \text{ (liquid)}$$

To partially offset the cost of the FGD installation, in some designs, the calcium sulfite may be further oxidized to produce marketable $CaSO_4.2H_2O$ (gypsum). This technique is also known as forced oxidation:

$$CaSO_3 \text{ (solid)} + 2H_2O \text{ (liquid)} + \tfrac{1}{2}O_2 \text{ (gas)} \rightarrow CaSO_4 \cdot 2H_2O \text{ (solid)}$$

A natural alkaline usable to absorb $SO_2$ is seawater. The $SO_2$ is absorbed in the water, and when oxygen is added reacts to form sulfate ions $SO_4$— and free H+. The surplus of H+ is offset by the carbonates in seawater pushing the carbonate equilibrium to release $CO_2$ gas:

In industry a 50 Baume solution of caustic (NaOH) is often used to scrub $SO_2$, producing $Na_2SO_3$ (sodium sulfite):

$$2NaOH \text{ (aq)} + SO_2 \text{ (gas)} \rightarrow Na_2SO_3 \text{ (aq)} + H_2O \text{ (liquid)}$$

The reaction taking place in wet scrubbing using a $Na_2CO_3$ (sodium carbonate—aka soda ash) slurry produces $Na_2SO^3$ (sodium sulfite) and can be expressed as:

$$Na_2CO_3 \text{ (solid)} + SO_2 \text{ (gas)} \rightarrow Na_2SO_3 \text{ (solid)} + CO_2 \text{ (gas)}$$

II. Systems for Inhibiting Buildup of Crystalline Products and Byproducts in an FGD Unit As discussed above, one significant challenge associated with operating an FGD unit is the accumulation crystalline solids in the FGD unit. The crystalline solids can accumulate as large crystals on various surfaces in the FGD unit. If left unchecked, the crystalline buildup can eventually impede airflow and reduce the efficiency of the unit. Typically, in order to remove the crystalline buildup it has been necessary to take the FGD unit (and the power generating unit connected to it) offline. This results in lost power generation and significant lost revenues. In addition, workers have to get inside the FGD unit and use high-pressure water sprayers (e.g., 10,000 psi) in order to remove the crystals. This is time consuming and poses significant safety issues.

Figure 1A:
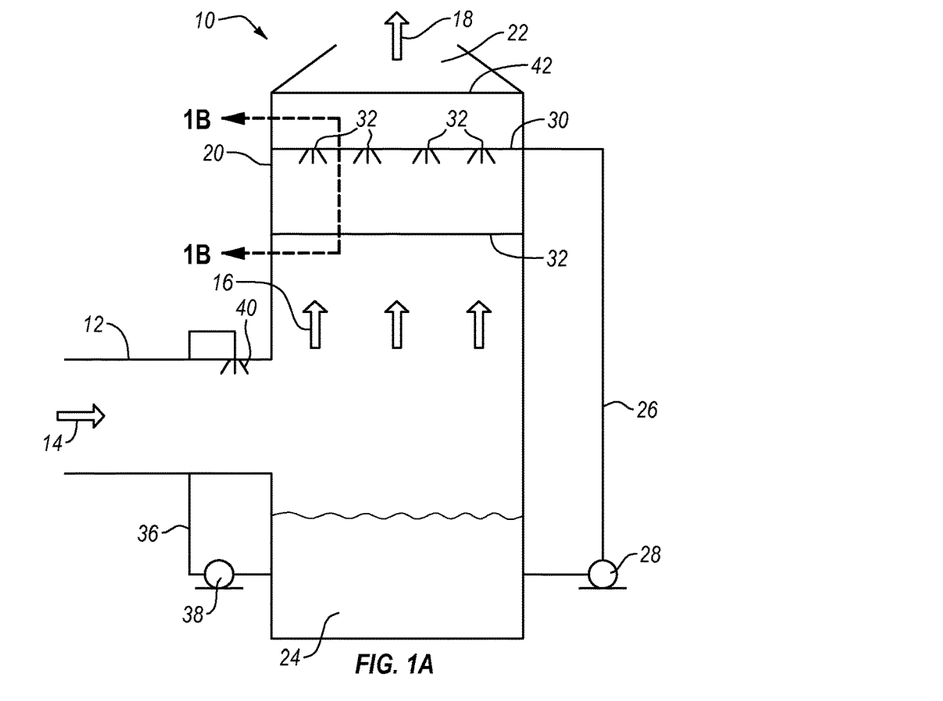
FIG. 1A illustrates a cutaway view flue gas desulfurization unit that includes a system for inhibiting crystalline buildup, according to one embodiment of the present disclosure.

Referring now to FIG. 1A, a system 10 that includes a flue of a gas desulfurization (FGD) unit and system(s) for inhibiting crystalline buildup in the FGD unit is illustrated. The system 10 includes a vessel 20 that serves to house the FGD unit. Flue gas 14 enters the vessel 20 through duct 12. The flue gas drifts up through the vessel 20 as depicted at 16; the cleaned flue gas 18 exits the vessel 20 exits the vessel at 22. Prior to exiting the FGD unit 20, the flue gas, which carries a lot of water vapor due to the nature of the desulfurization process, may be dewatered by passing through a condensation unit 42. The cleaned flue gas 18 may be discharged directly to the air or be sent for further processing.

As illustrated in FIG. 1, the vessel/FGD unit 20 includes a reservoir of desulfurization agent 24. The desulfurization agent may include calcium carbonate (limestone), calcium-magnesium carbonate (dolomite), calcium oxide, calcium hydroxide $Ca(OH)_2$, sodium carbonate ($Na_2CO_3$), sodium hydroxide (NaOH), magnesium hydroxide ($Mg(OH)_2$), and the like. In an alternative embodiment (not shown), the reservoir of desulfurization agent 24 may be essentially external to the vessel/FGD unit 20.

In any case, the reservoir of desulfurization agent 24 is connected to a spray bar 30 and a plurality of sprayers 32 via a first recirculation line 26 and a first recirculation pump 28. As the flue gas 16 rises through the vessel 20, the first recirculation line 26 and a first recirculation pump 28 draw desulfurization agent from the reservoir 24 and deliver it to the sprayers 32. The hot, rising flue gas 16 reacts with the chemicals in the desulfurization agent 24 (e.g., calcium carbonate) to extract $SO_2$ from the flue gas. In many FGD units, the desulfurization agent 24 is sprayed onto a contact plate 34 that is configured to increase the surface area of contact between the flue gas and the desulfurization agent. The contact plate will be discussed in greater detail below in reference to FIG. 1B.

In the illustrated embodiment, the system 10 further includes a presaturation sprayer 40 that pre-contacts the hot flue gas 14 with the desulfurization agent 24 prior to the gas entering the vessel 20. The presaturation sprayer 40 is fluidly connected to the reservoir of desulfurization agent 24 via a second recirculation line 36 and a recirculation pump.

Figure 1B:
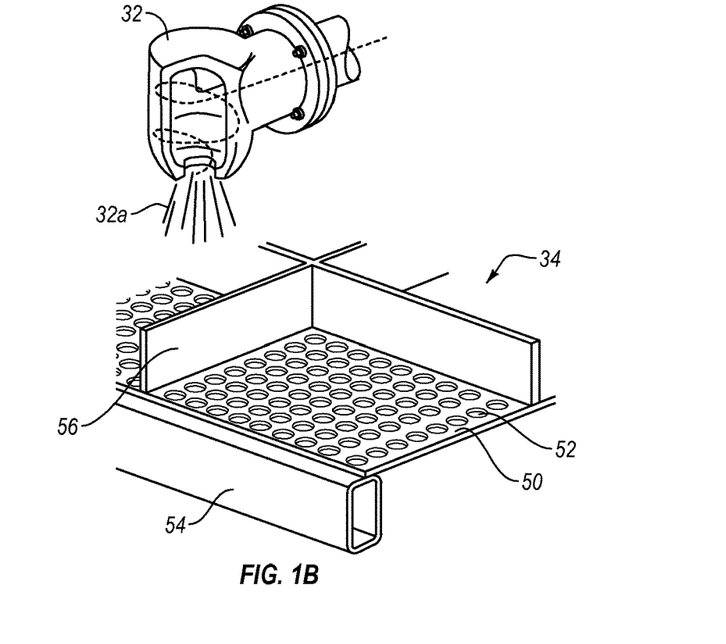
FIG. 1B illustrates a spray system and a fluid/gas contactor plate of the flue gas desulfurization unit illustrated in FIG. 1A.

Referring now to FIG. 1B, a spray head 32 and the contact surface 34 of the flue gas desulfurization (FGD) unit 20 are illustrated in greater detail. The spray head can have a number of possible sizes and configurations depending on the size and capacity of the flue gas desulfurization unit 20. For instance, at a typical power generation station, the flue gas desulfurization vessel may be as large as 20-40 feet in diameter and each spray head 32 may be 0.5-1.5 feet in diameter. The presaturation sprayers 40 are similar to the sprayers 32. In a typical FGD unit 20, the contact surface 34 includes a number of contact plates 50 that each include hundreds of small holes 52 drilled, punched, or otherwise formed therein. In the illustrated embodiment, the contact plates 50 are supported by upper 56 and lower 54 supports.

In the illustrated operation, the spray head 32 sprays the desulfurization agent down onto the contact plate 50. As the flue gas flows up through the FGD unit 20, the flue gas passes through the holes 52 that are coated with the desulfurization agent.

Essentially all of the surfaces within the FGD unit 20 are susceptible to buildup and growth of crystalline materials (e.g., calcium sulfite and sodium sulfite). As crystalline materials build up, they can adversely impact the function of the unit 20. For instance, the spray heads 32 and 40, the contact plate 50 and the holes therein 52, and the walls of the unit are all susceptible crystalline buildup. In the case of the spray heads, such crystalline buildup can lead to partial or complete blockage of the spray heads 32 and 40. In the case of the contact plate 50 and the holes therein 52, crystalline buildup can start on the underside of the contact plates 50 and around the holes 52. The buildup starts from the outside of the holes 52 and grows toward the center, decreasing the diameter of the holes 52. This increases the differential pressure across the contact plates 50. This differential pressure, although typically small, can be enough to lift and flip the contact plates 50. The flipped contact plates 50 are a problem when the time comes to clean the unit 20, and they also result in increased particulate emissions due to higher gas velocities in the FGD unit.

The systems described herein address these issues related to crystalline buildup on the various surfaces in a flue gas desulfurization unit by disposing a bacterial strain in the FGD unit. The bacterial strain (or strains) is adapted to grow in the FGD unit and to inhibit crystalline formation therein. For instance, the bacterial strain may grow and proliferate in the FGD unit and form a biofilm on one or more surfaces therein. It is believed that such biofilm formation may inhibit adherence of crystalline materials to the surfaces in the FGD unit. Alternatively or in addition, the bacterial strain(s) may produce a biosurfactant that can inhibit the ability of crystalline solids to adhere to and/or grown surfaces within the FGD unit. In another instance, it is believed that the bacterial strain may grow on the crystalline materials and/or produce a biosurfactant and prevent the formation of dense crystals, so that the crystals can be removed with a gentle spray of water as opposed to high pressure sprays.

Thus, in one embodiment, the bacterial strain(s) selected to be disposed in the FGD unit includes a biosurfactant and/or biofilm producing bacterium.

A number of bacterial and archaeal species can be used in the systems and methods described herein. In one example *Rhodococcus, Bacillus, Pseudomonas, Clostridia, Burkholderia, Proteobacteria* such as *Oceanospirillum, Neptunomonas, Alcanivorax*, and the like are useful for inhibition of crystalline formation in an FGD unit. In another example, *Acetobacter* sp., *Acidiothiobacillus* sp., Sulfate Reducing *Bacterial* sp., *Acetobacterium* sp., *Clostridia* sp., *Pseudomonas* sp., *Bacillus* sp. and the like are useful for acid production. And in yet another example, *Halobacterium* is a group of Archaea that contains the genus *Halococcus* and others that have a high tolerance for elevated levels of salinity. Some species of halobacteria have acidic proteins that resist the denaturing effects of salts. *Chromohalobacter* is another species. In addition, species such as *Methanosarcina* sp. *Methanococcus* sp., Sulfate Reducing *Bacterial* sp., *Acetobacterium*, sp., *Clostridia* sp., *Pseudomonas* sp., *Bacillus* sp. and other microbes (*Micrococcus, Achromobacter, Flavobacterium, Bacterioides, Serratia, Alcaligenes*, and *Cellulomonas*) have been found in high salt environments that are similar to the environment found in an FGD unit. In one embodiment, the bacteria used in the systems and methods described herein includes a biosurfactant and/or biofilm producing bacterium. In a preferred embodiment, the bacteria used in the systems and methods described herein are *Bacillus subtilis* and *Bacillus chitinosporus* and variants thereof. In another preferred embodiment, the bacteria in the inoculant may include a mixture of *Bacillus subtilis, Bacillus chitinosporus, Bacillus amyloliquefaciens*, and *Bacillus licheniformis*.

*Bacillus subtilis* is a Gram-positive, catalase-positive bacterium, found in soil, the gastrointestinal tract of ruminants and humans. A member of the genus *Bacillus*, *B. subtilis* is rod-shaped, and has the ability to form a tough, protective endospore, allowing the organism to tolerate extreme environmental conditions.

*Bacillus chitinosporus* is a bacterium found in soil and root extracts of certain plants. *B. chitinosporus* strains are known primarily for their ability of produce nematicidal and insecticidal active metabolites. See, for example, U.S. Pat. No. 5,733,544.

*Bacillus amyloliquefaciens* is a bacterium closely related to *B. subtilis*. For instance, it was long believed that the *B. amyloliquefaciens* was a subspecies of *B. subtilis*. *Bacillus licheniformis* is a soil bacterium that is also related to *B. subtilis*. As mentioned briefly in the Background section of this application, flue gases typically contain heavy metal pollutants and the scrubber units described herein can trap those heavy metal pollutants. In addition to preventing crystalline buildup in the FGD unit, the inventor in this case has also observed that bacteria such as, but not limited to, *Bacillus subtilis, Bacillus chitinosporus, Bacillus amyloliquefaciens*, and *Bacillus licheniformis* can be useful for remediating the heavy metals trapped by the FGD unit and rendering them non-toxic to the environment.

The bacterial strains used on the systems and methods described herein may be grown in any conventional growth medium that supports bacterial growth. Examples of suitable broth for culturing *Bacillus* sp., include but are not limited to, a broth composed of peptone, dextrose, yeast extract and malt extract and a broth using the same ingredients as well as proflo cottonseed extract and soy flour. Solid substrates are also suitable for growing *Bacillus* sp., strains. Growth procedures may also be readily scaled up to large fermenters by methods well known in the art.

In one embodiment, the bacterial strain(s) disposed in the FGD unit may be delivered to the site of use in dry form. Bacteria may be grown and subsequently lyophilized by methods well known in the art. Likewise, the bacterial strain(s) disposed in the FGD unit may be delivered to the site of use in liquid media. Bacteria may be grown and subsequently stored in liquid media by methods well known in the art.

All microbes require nutrient components, C:N:P:S:vitamins: and others, in specific ratios to grow and metabolize various organics. Any imbalance in these ratios can slow or halt microbial growth. Flue gases containing SOx, NOx, $CO_2$ and other components can provide these nutrients in liquid form or as aerosols. Microbes tolerant to higher salt and ionic strength may be naturally adapted to grow in the solutions that utilize high concentrations of flue gases.

Considerable enhancement of microbial growth and metabolism can be obtained by providing and maintaining the proper microbial population, environmental, and nutrient component balance. For example, with the addition (e.g., staged and/or cyclical addition) of appropriate microbes, nutrients, and environmental adjustment components at various points, significant reductions in crystalline buildup in an FGD unit are possible.

Figure 2:
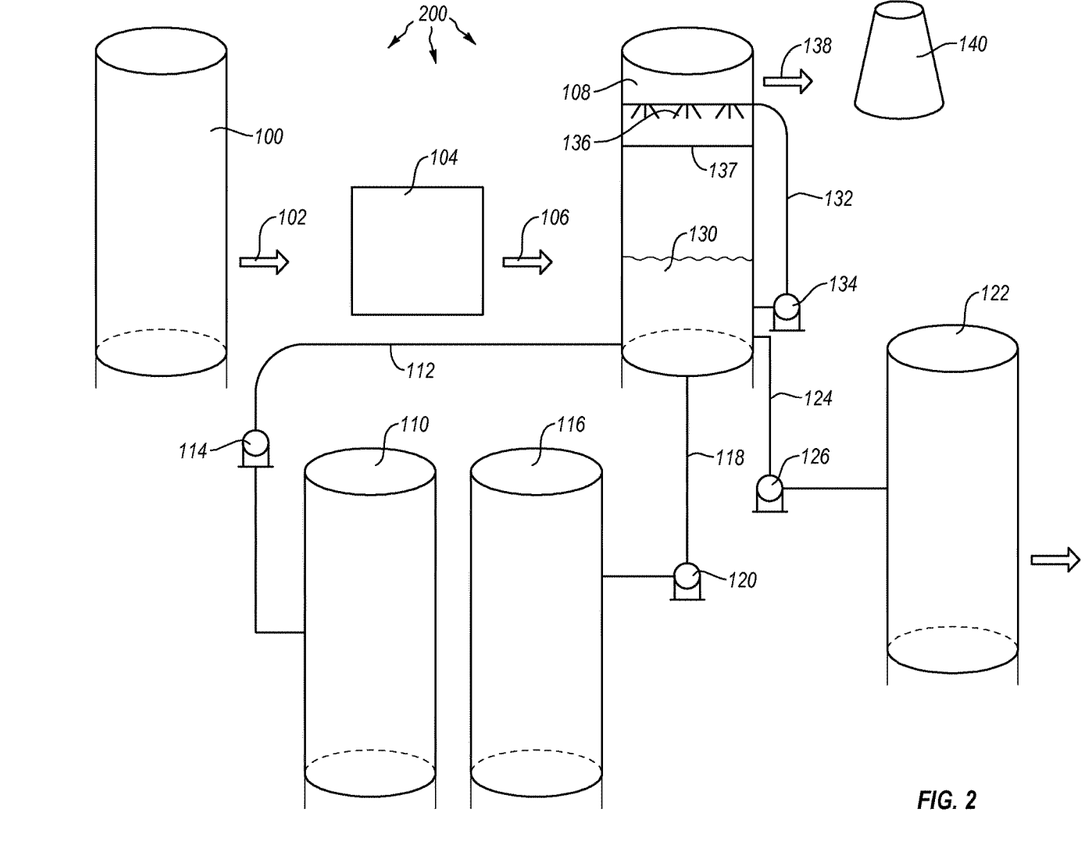
FIG. 2 is a schematic illustration of a power plant with a flue gas treatment system that includes a flue gas desulfurization unit that includes systems for inhibiting crystalline buildup in the flue gas desulfurization unit, according to one embodiment of the present disclosure.

Referring now to FIG. 2, a power generation and/or flue gas-handling unit 200 that includes another embodiment of a system for preventing or inhibiting crystalline buildup in a FGD unit is illustrated. In the illustrated embodiment, the power generation and/or flue gas-handling unit 200 includes a boiler 100. The boiler 100 may burn coal, oil, or another sulfur containing fuel; as a result, the boiler 100 produces flue gas 102 that contains $SO_x$ pollutants that need to be removed downstream before the flue gas is discharged t. Particulates (e.g., fly ash) are removed from the flue gas 102 in an electrostatic precipitator 104 (or the like). The flue gas 106 from the electrostatic precipitator 104 is then sent to a flue gas desulfurization unit 108. Treated flue gas may be discharged from the FGD unit and sent directly to a discharge stack 140 or to one or more systems for further processing. As will be described in greater detail below, the flue gas desulfurization unit 108 includes systems for inhibiting or preventing crystalline buildup.

Similar to the systems discussed in reference to FIGS. 1A and 1B, the FGD unit 108 includes a vessel, a reservoir of desulfurization agent 130, a recirculating system (i.e., pump 134 and recirculating line 132), sprayers 136, and contact surface 137. In addition, the system 200 includes an external reservoir of desulfurization agent 110 that can be used via line 112 and pump 114 to replenish the spent desulfurization agent in the FGD unit 108. Likewise, the system includes an external reservoir 122 that can be used for withdrawing spent desulfurization agent from the FGD unit 108 via line 124 and pump 126. While the system 200 shows a tank 122, it is understood that the external reservoir for spent desulfurization agent can also include a holding facility such as a pond or waste lagoon.

The system 200 also includes means for inoculating the FGD unit 108 with an inoculum that includes one or more bacterial strains that are adapted to grow in the FGD 108 unit and to inhibit crystalline formation therein. In the illustrated embodiment, the means for inoculating the FGD unit 108 include an external holding vessel 116 that is designed to hold the bacteria until they are added to the FGD unit 108 and a feed system. The feed system may include devices for delivering a dry or liquid bacterial preparation to the FGD unit 108. In the illustrated embodiment, the feed system includes a feed line 118 that feeds into the reservoir 130 in the FGD unit 108 and a feeder 120. In the case of a dry bacterial preparation, the feeder 120 may be screw auger or the like that is configured for "pumping" a dry powder. Likewise, the feeder 120 may be configured to withdraw a dry bacterial preparation from the vessel 116, mix it with aqueous media (e.g., water), and deliver a rehydrated bacterial preparation to the FGD unit 108. Alternatively, if the vessel 116 includes liquid bacterial preparation, the feeder 120 may be a pump designed deliver liquid to the FGD unit 108.

The feed system (i.e., line 118 and the feeder 120) may be designed to deliver an initial inoculum to the FGD unit 108 followed by periodic re-inoculations designed to maintain a population of bacteria in the FGD unit. Following the initial inoculation, the FGD unit 108 may be re-inoculated on a selected schedule. Thus, the feed system may be designed to feed bacteria from the vessel 116 to the FGD unit at a selected constant rate or on an hourly, daily, or weekly re-inoculation schedule.

In an embodiment, the feed system (i.e., line 118 and the feeder 120) may be designed to deliver a selected amount of bacteria to the FGD unit. In one embodiment, the inoculum has a selected volume and a selected bacterial cell density in a range of 0.01 weight % (wt %) to 10 wt %, 0.05 wt % to 5 wt %, 0.1 wt % to 3 wt %, 0.2 wt % to 2 wt %, 0.25 wt % to 1 wt %, or 0.3 wt % to 0.5 wt %. The volume of the inoculum will vary depending on factors such as, but not limited to, the size of the FGD unit, the desulfurization chemistry utilized in the FGD unit, the temperature of the flue gas, etc. In a typical FGD unit, the initial inoculum may have a volume of about 50-200 gallons (e.g., 100 gallons) of bacterial solution at about 0.2 wt % to 2 wt % (e.g., 0.3 wt %) followed by weekly maintenance doses of about 10-100 gallons (e.g., 50 gallons) of bacterial solution at about 0.2 wt % to 2 wt % (e.g., 0.3 wt %).

III. Methods for Inhibiting Buildup of Crystalline Products and Byproducts in an FGD Unit Methods for inhibiting buildup of crystalline products and byproducts in a flue gas desulfurization (FGD) unit are described. Methods include providing an FGD unit configured for desulfurization of a flue gas. The FGD unit systems described herein above may be used in the following methods. One will appreciate, however, that the examples described in reference to FIGS. 1A-2 are merely illustrative and that there are a number of other flue gas desulfurization unit designs known and in use. Such designs are generally susceptible to crystalline buildup and will benefit from the methods and systems described herein.

The methods described herein further include preparing an inoculum that comprises a bacterial strain (e.g., a biosurfactant and/or biofilm producing bacterium) adapted to grow in the FGD unit and to inhibit crystalline formation therein, and inoculating the FGD unit with a first amount of the inoculum such that the bacteria are present on one or more surfaces therein so as to inhibit crystalline buildup in the FGD unit. The inoculum has a selected volume and a selected bacterial cell density in a range of 0.01 weight % (wt %) to 10 wt %.

Typical FGD units are described herein above. In one embodiment, an FGD unit used in the methods described herein includes a vessel with a flue gas inlet and a flue gas outlet and a liquid reservoir containing a desulfurization agent and the bacterial strain from the inoculum, a recirculation/spray system configured to recirculate and spray the desulfurization agent through the FGD unit, and one or more contact surfaces in the vessel configured for contacting the flue gas and the desulfurization agent recirculated and sprayed from the reservoir, wherein the one or more contact surfaces include a perforated plate.

In one embodiment, the method further includes reinoculating the FGD unit with at least a second amount of the inoculum. In one embodiment, the reinoculating may occur more-or-less constantly (e.g., small amounts of bacteria may be fed into the FGD unit whenever additional desulfurization agent is added to replenish spent desulfurization agent) or in a range of hourly, daily, or weekly.

In one embodiment, the inoculum has a selected volume and a selected bacterial cell density in a range of 0.01 weight % (wt %) to 10 wt %, 0.05 wt % to 5 wt %, 0.1 wt % to 3 wt %, 0.2 wt % to 2 wt %, 0.25 wt % to 1 wt %, or 0.3 wt % to 0.5 wt %. The volume of the inoculum will vary depending on factors such as, but not limited to, the size of the FGD unit, the desulfurization chemistry utilized in the FGD unit, the temperature of the flue gas, etc. In a typical FGD unit, the initial inoculum may have a volume of about 50-200 gallons (e.g., 100 gallons) of bacterial solution at about 0.2 wt % to 2 wt % (e.g., 0.3 wt %) followed by weekly maintenance doses of about 10-100 gallons (e.g., 50 gallons) of bacterial solution at about 0.2 wt % to 2 wt % (e.g., 0.3 wt %).

In one embodiment, the inoculum is provided in a dry form, with the method further including mixing the inoculum with an aqueous medium (e.g., water) prior to inoculating the FGD unit with the inoculum. In another embodiment, the inoculum is provided in a liquid form wherein the bacterial strain is suspended in an aqueous medium.

*Bacterial* strain(s) that may be used to inoculate the FGD unit include, but are not limited to, at least one a bacterial, proteobacterial, or archaeal species selected from the group consisting of *Rhodococcus, Bacillus, Pseudomonas, Clostridia, Burkholderia, Oceanospirillum, Neptunomonas, Alcanivorax, Acetobacter* sp., *Acidiothiobacillus* sp., *Acetobacterium* sp., *Clostridia* sp., *Pseudomonas* sp., *Bacillus* sp., *Halobacteria, Halococcus, Chromohalobacter, Methanosarcina* sp., *Methanococcus* sp., *Acetobacterium,* sp., *Clostridia* sp., *Pseudomonas* sp., *Micrococcus, Achromobacter, Flavobacterium, Bacterioides, Serratia, Alcaligenes, Cellulomonas*, and variants thereof. Preferably, the bacterial strain(s) that may be used to inoculate the FGD unit include *Bacillus subtilis* and *Bacillus* chitinosporus and variants thereof.

IV. Example

*Bacterial* strains selected from amongst those described in the present application were tested in order to understand the scope of the problems associated with crystalline buildup in an FGD unit and to assess the ability of such bacterial strains to inhibit or prevent crystalline buildup. The inventor tested selected bacterial strains using the methods and systems described herein to assess their ability to inhibit buildup of crystalline materials of an FGD unit of a typical working power plant.

The FGD unit on generation unit 3 at the Naughton power plant experiences large amounts of buildup that restricts the flow of the flue gas. This buildup is primarily on the perforated trays and the inlet duct. The various types of buildup result in increased differential pressure in the scrubber vessel. These increased pressure differentials cause multiple problems. Some of the potential problems caused by the differential pressures are: flipped trays, increased particulate emissions attributed to the scrubber, unit outages to clean trays and increased operation and maintenance cost associated with having to take the generation unit offline so that the FGD unit can be cleaned.

Crystalline buildup in the unit was seen to be particularly problematic on the fluid/gas contactor trays. The buildup on the perforated trays (see, e.g., FIG. 1B) is on the underside of the holes in the trays. The buildup starts from the outside of the perforations and grows towards their center, decreasing the diameter of the perforations. This increases the differential pressure across the trays. This pressure, although small (e.g., on the order of a couple of water inches), is enough to lift and flip the trays. There is a need to prevent the tray flipping. In order to do this, the holes in the perforated trays must remain clean. It is the restriction of the perforated trays that increases the differential pressures. The flipped trays are a problem when the time comes to clean the scrubber, and they also result in increased particulate emissions due to higher gas velocities.

When the time to clean the scrubber comes, the Naughton safety team has typically had to rig ropes for entry into the FGD unit to right the flipped trays. This has cost an average of three hours of work and outage time. That time spent delays the entirety of the clean. All time spent in delaying the scrubber clean results in one of two things: an extended outage, or a less thorough clean. The extended outage costs the company lost generation. A calculation for the lost generation for routine maintenance has been given in Equation 1. Routine maintenance does not include a complete clean of the unit. A clean that is not complete results in more frequent outages to clean the scrubber.

Lost Generation ($)=Price per megawatt (MW)×time delayed×MW possible $=$25/hr×3 hr×280 MW $=$21,000     Equation 1

The increased particulate emissions, as a result of the flipped trays, are a compliance issue. An integral part of the plant's environmental permitting is Mercury and Air Toxics Standards (MATS). If the particulate emissions increase enough, the plant is no longer complaint with MATS. Non-compliance can result in more unit outages. In most years there are 2-3 maintenance outages per year in which the unit has been brought offline specifically to clean and maintain the FGD unit. These outages result in a loss of 280 MW for 36-48 hours. According to Equation 1, this represents a cost of ~$250,000 to ~$335,000. In addition to the cost of lost generation, there is an average cost of about $30,000 for contractors to perform a clean of the FGD unit. Conservatively, it is believed that at least one of these yearly outages could be avoided by using the bacterial methods and systems described in the present application. Avoiding just one of these outages would represent a cost savings of ~$250,000 to ~$335,000 in generation time alone.

Microbe Theory:

In order to test whether the bacterial strains described in the present application could address some of the problems with crystalline buildup in the unit 3 FGD unit, Naughton's lab personnel were given a sample of *Bacillus subtilis* and *Bacillus chitinosporus* and variants thereof for testing. The theory behind the microbe is to form a bio-film, or protective layer, on all of the metal parts in the FGD unit and to then prevent or inhibit buildup of crystalline deposits on the various surfaces in the FGD unit. It is believed that the bio-film forming bacteria may be able to consume the buildup-causing compounds in the recycle slurry. If build up continues forming on the underside of the trays, the crystals would be more soluble and more easily removed by the under tray spray system. This should prevent the crystalline buildup on the underside of the trays. In consequence, the holes in the perforated trays should remain clear and differential pressure should stay low.

Test Results:

There were two sets of tests that have been completed on the microbes so far with two more in the process of being tested. The initial test yielded results showing that the crystalline structure of the buildup is favorably changed in the presence of the microbes. It also illustrated that the steel was protected in such a way that the would-be-buildup was easily rinsed way. A control sample was tested in the absence of microbes to illustrate what the current conditions of the FGD unit would look like under the exact same conditions.

It was observed that the control test yielded long, thin crystals that intertwined to form a crystalline buildup that is very dense and is very difficult to break down. The test sample in the presence of the microbes yielded very small crystals that appeared to be irregular cubic shapes. These smaller crystals were easily rinsed way as they had no definite crystal structure.

The second test was performed to confirm the results of the previous test. Having already established what happened in the absence of microbes, we did not feel a need to run a second control sample. We ran a second test sample with the prescribed concentration of microbes. The other sample was performed with an excess of microbes to simulate what may happen if the microbes were to overpopulate the scrubber or to be grossly overfed inadvertently.

The sample with an excess of microbes indicated that there would be no operational issues with an over feed situation. It is assumed that the overpopulation of the microbes caused them to have a shortage of consumables in their ecosystem of the test. This added credibility to the value of our test dose concentration. The other test, with the prescribed amount of microbes, was performed in the same manner as the first test.

The results were nearly identical to the first test. The crystals were small and easily rinsed away during the cleanup step. There was one slight difference as compared to the first test and that is that the samples of recycle slurry used in the second test had much more ash. This ash resulted in the crystals forming a cake of crystal and ash. This cake was easily broken with the gentle flow of water and dispersed into ash and crystals. The ash was easily rinsed away and then the crystals fell apart. This confirmed the results of the first tests performed. Videos were taken of the rinsing process for second test.

It is worthwhile to comment on the microscopic structure of the two types of crystals. When viewed under a 10× power microscope, the difference in the size and shape of the crystals is very evident. Please note that the larger crystals (absence of microbes) are closely bonded to one another. The smaller crystals (presence of microbes) are loose and independent of one another. They were held together with the ash as the test sample dried out at the conclusion of the test cycle. This results in the easy rinsing that has been mentioned.

Practical Application:

The tested microbes and the related microbes described in the present application and the crystalline structure that results from their presence has many potential benefits for Naughton's unit 3 FGD unit and for FGD units in general. The following outlines the benefit and reason it is a benefit:
- Less buildup on the underside of the trays.
- Decreased differential pressure (DP) across the trays.
- Fewer flipped trays.
- Decreased time in outages to flip trays back over.
- Lower gas velocities in the vessel.
- Fewer PM emission attributed to the scrubber.
- More efficient $SO_2$ reduction.
- Safer working condition during outages.
- Cleaner demisters.
- Fewer unit maintenance outages due to high DP.
- Less time spent cleaning trays.
- Longer tray life.
- Shorter outages.
- Less buildup in the scrubber inlet and ducts.
- Decreased inlet pressure.
- Fewer maintenance outages due to high inlet pressure.
- Lower gas velocities.
- Decreased PM attributed to scrubber.
- Less time cleaning inlets.
- Shorter outages.

The increased unit availability due to decreased outage time is one of the biggest benefits to the application of these microbes. As noted above, preventing just one 36-48 hour outage per year represents a cost savings of up to ~$250,000 to ~$335,000 in generation time alone. Likewise, the chemical environment in a FGD unit is quite harsh. The formation of a protective biofilm on the metal parts in the FGD unit results in a potential for great payoff in the remaining life of the scrubber.

There is also a great benefit to be found in the decrease in cleaning time. The companies that clean scrubber units charge by the hour. If the material is easier to remove, the clean will cost significantly less. It is difficult to quantify the money saved in the time to clean the scrubber due to the fact that a clean in the presence of the microbes has never been performed. If laboratory tests are representative of what can be expected in the scrubber, it is not unfair to assume that the outage time to clean would be reduced by one half. It is possible that with the systems and methods described herein that outages due to crystalline buildup could be prevented entirely.

There is a potential that the addition of the microbes could make the FGD unit self-cleaning. The nature of the liquid flow in the scrubber is very turbulent. In our tests the ash caused the crystals to form a cake on the bottom of the vessel. In the turbulent environment of the scrubber, it is expected that the ash would never have the opportunity to settle. Thus the cake structure should never form, leaving only crystals that can easily be broken apart. If this is the case, the need for scrubber cleans could be completely mitigated.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for inhibiting crystalline buildup in a flue gas desulfurization (FGD) unit, comprising:
    providing an FGD unit configured for desulfurization of a flue gas;
    preparing an inoculum that comprises a bacterial strain comprising at least one of *Bacillus subtilis* or *Bacillus chitinosporus*, the bacterial strain being adapted to grow in the FGD unit, to form a biofilm on one or more surfaces therein so as to inhibit formation of calcium sulfite and sodium sulfite crystals therein, wherein the inoculum has a selected volume and a selected bacterial cell density in a range of 0.01 weight % (wt %) to 10 wt %; and
    inoculating the FGD unit with a first amount of the inoculum, the first amount being from 50 gallons to 200 gallons wherein the first amount of the inoculum has a bacterial cell density in the range from 0.01 wt % to 10 wt % such that the bacteria form a biofilm on one or more surfaces in the FGD unit so as to inhibit crystalline buildup of calcium sulfite and sodium sulfite in the FGD unit.

2. The method of claim 1, wherein the FGD unit comprises:
    a vessel with a flue gas inlet and a flue gas outlet and a liquid reservoir containing a desulfurization agent and the bacterial strain from the inoculum;
    a recirculation/spray system configured to recirculate and spray the desulfurization agent through the FGD unit; and
    one or more contact surfaces in the vessel configured for contacting the flue gas and the desulfurization agent recirculated and sprayed from the reservoir, wherein the one or more contact surfaces include a perforated plate.

3. The method of claim 2, wherein the bacterial strain forms a biofilm on the one or more contact surfaces of the perforated plate in the FGD unit in order to inhibit crystalline buildup of calcium sulfite and sodium sulfite thereon.

4. The method of claim 1, wherein the bacterial strain in the inoculum further comprises at least one of a bacterial, proteobacterial, or archaeal species selected from *Rhodococcus, Pseudomonas, Clostridia, Burkholderia, Oceanospirillum, Neptunomonas, Alcanivorax, Acetobacter* sp., *Acidiothiobacillus* sp., *Acetobacterium* sp., *Clostridia* sp., *Pseudomonas* sp., *Bacillus* sp., *Halobacteria, Halococcus, Chromohalobacter, Methanosarcina* sp., *Methanococcus* sp., *Acetobacterium*, sp., *Clostridia* sp., *Pseudomonas* sp., *Micrococcus, Achromobacter, Flavobacterium, Bacterioides, Serratia, Alcaligenes, Cellulomonas*, or variants thereof.

5. The method of claim 1, wherein the bacterial strain in the inoculum comprises both of *Bacillus subtilis*, and *Bacillus chitinosporus*.

6. The method of claim 1, further comprising reinoculating the FGD unit with at least a second amount of the inoculum.

7. The method of claim 6, wherein the reinoculating occurs in a range of daily to weekly.

8. The method of claim 1, the inoculum being provided in a dry form, and wherein the method further comprises mixing the inoculum with an aqueous medium prior to inoculating the FGD unit with the inoculum.

9. The method of claim 1, the inoculum being provided in a liquid form wherein the bacterial strain is suspended in an aqueous medium.

10. A method for inhibiting crystalline buildup in a flue gas desulfurization (FGD) unit, the method comprising:
    providing an FGD unit configured for desulfurization of a flue gas, wherein the FGD unit comprises:
        a vessel with a flue gas inlet and a flue gas outlet and a liquid reservoir containing a desulfurization agent;

a recirculation/spray system configured to desulfurization agent through the FGD unit; and one or more contact surfaces in the vessel configured for contacting the flue gas and the desulfurization agent recirculated from the reservoir, wherein the one or more contact surfaces include a perforated plate;

preparing an inoculum that comprises a bacterial strain comprising at least one of *Bacillus subtilis* or *Bacillus chitinosporus*, the bacterial strain being adapted to grow in the FGD unit and to form a biofilm on the perforated plate to inhibit formation of calcium sulfite and sodium sulfite crystals thereon, wherein the inoculum has a selected volume and a selected bacterial cell density in a range of 0.01 weight % (wt %) to 10 wt %; and inoculating the FGD unit with a first amount of the inoculum the first amount being from 50 gallons to 200 gallons wherein the first amount of the inoculum has a bacterial cell density in the range from 0.01 wt % to 10 wt % such that the bacteria form a biofilm on one or more surfaces of the perforated plate so as to inhibit buildup of calcium sulfite and sodium sulfite crystals on the perforated plate;

wherein the bacterial strain in the inoculum further comprises at least one of a bacterial, proteobacterial, or archaeal species selected from *Rhodococcus, Pseudomonas, Clostridia, Burkholderia, Oceanospirillum, Neptunomonas, Alcanivorax, Acetobacter* sp., *Acidiothiobacillus* sp., *Acetobacterium* sp., *Clostridia* sp., *Pseudomonas* sp., *Halobacteria, Halococcus, Chromohalobacter, Methanosarcina* sp., *Methanococcus* sp., *Acetobacterium*, sp., *Clostridia* sp., *Pseudomonas* sp., *Micrococcus, Achromobacter, Flavobacterium, Bacterioides, Serratia, Alcaligenes*, or *Cellulomonas*.

11. The method of claim 10, wherein the bacterial strain comprises both of *Bacillus subtilis*, and *Bacillus chitinosporus*.

12. A method for inhibiting crystalline buildup in a flue gas desulfurization (FGD) unit, the method, comprising:

providing an FGD unit configured for desulfurization of a flue gas, wherein the FGD unit comprises:

a vessel having a flue gas inlet and a flue gas outlet and a first liquid reservoir containing a desulfurization agent;

a recirculation/spray system configured to desulfurization agent through the FGD unit; and one or more contact surfaces in the vessel configured for contacting the flue gas and the desulfurization agent recirculated from the first liquid reservoir, wherein the one or more contact surfaces include a perforated plate;

a second liquid reservoir containing the desulfurization agent, wherein the second liquid reservoir is fluidly connected to the FGD unit via a conduit and a pump, and wherein the second liquid reservoir is configured to replenish the desulfurization agent in the FGD unit; and a third reservoir configured to contain a selected bacterial strain that includes at least one of *Bacillus subtilis* or *Bacillus chitinosporus* adapted to grow in the FGD unit, wherein the third reservoir is coupled to the FGD unit via a conduit and a feed system, and wherein the third reservoir is configured for inoculating the FGD unit with the selected bacterial strain adapted to grow in the FGD unit to inhibit buildup of calcium sulfite and sodium sulfite crystals in the FGD unit;

preparing an inoculum that comprises the at least one of *Bacillus subtilis* or *Bacillus chitinosporus* adapted to grow in the FGD unit and to inhibit formation of calcium sulfite and sodium sulfite crystals therein, wherein the inoculum has a selected volume and a selected bacterial cell density in a range of 0.01 weight % (wt %) to 10 wt %;

placing the inoculum in the third reservoir; and inoculating the FGD unit with 50 gallons to 200 gallons of the inoculum, wherein the inoculum has a bacterial cell density from 0.01 wt % to 10 wt % such that the bacteria form a biofilm on at least the perforated plate so as to inhibit buildup of calcium sulfite and sodium sulfite crystals on the perforated plate.

13. The method of claim 12, wherein the selected bacterial strain further comprises at least one of a bacterial, proteobacterial, or archaeal species selected from *Rhodococcus, Pseudomonas, Clostridia, Burkholderia, Oceanospirillum, Neptunomonas, Alcanivorax, Acetobacter* sp., *Acidiothiobacillus* sp., *Acetobacterium* sp., *Clostridia* sp., *Pseudomonas* sp., *Halobacteria, Halococcus, Chromohalobacter, Methanosarcina* sp., *Methanococcus* sp., *Acetobacterium*, sp., *Clostridia* sp., *Pseudomonas* sp., *Micrococcus, Achromobacter, Flavobacterium, Bacterioides, Serratia, Alcaligenes, Cellulomonas*, or variants thereof.

14. The method of claim 12, wherein the feed system is configured to add a predetermined amount of the selected bacterial strain on a predetermined schedule, wherein the predetermined amount has a bacterial cell density in a range of 0.01 weight % (wt %) to 10 wt %.

15. The method of claim 14, wherein the feed system is configured to inoculate the FGD unit with a first inoculation of the selected bacterial strain followed by at least a second inoculation on a predetermined schedule of weekly to daily, and wherein the at least a second inoculation is smaller than the first inoculation.

16. The method of claim 12, wherein the selected bacterial strain is provided in a dry form, and wherein the feed system is configured to mix a predetermined amount of the dry form with an aqueous medium prior to inoculating the FGD unit.

17. The method of claim 12, wherein the selected bacterial strain is provided in a liquid form, and wherein the feed system is configured to pump the liquid into the FGD unit so as to inoculate the FGD unit.

18. The method of claim 12, wherein the bacterial strain comprises both *Bacillus subtilis* and *Bacillus chitinosporus*.

* * * * *